June 1, 1965 R. L. SKINNER, SR 3,186,701
SPRING
Filed March 4, 1963
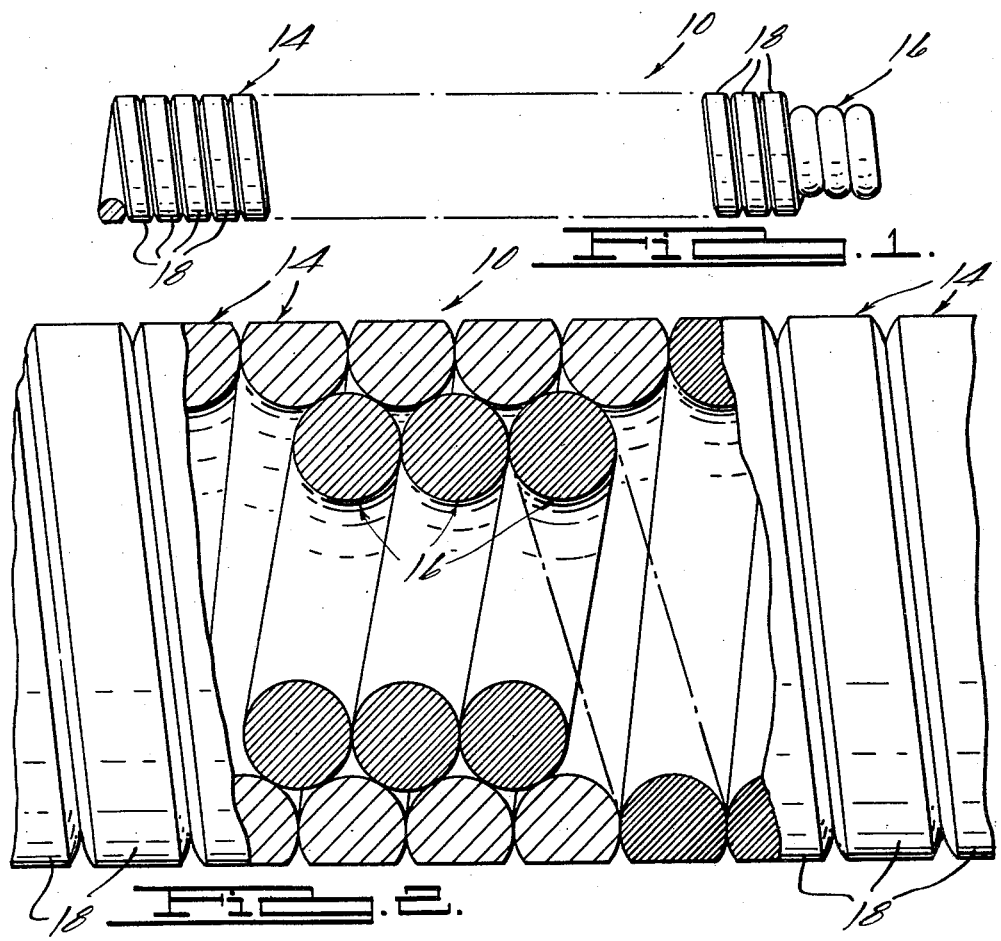
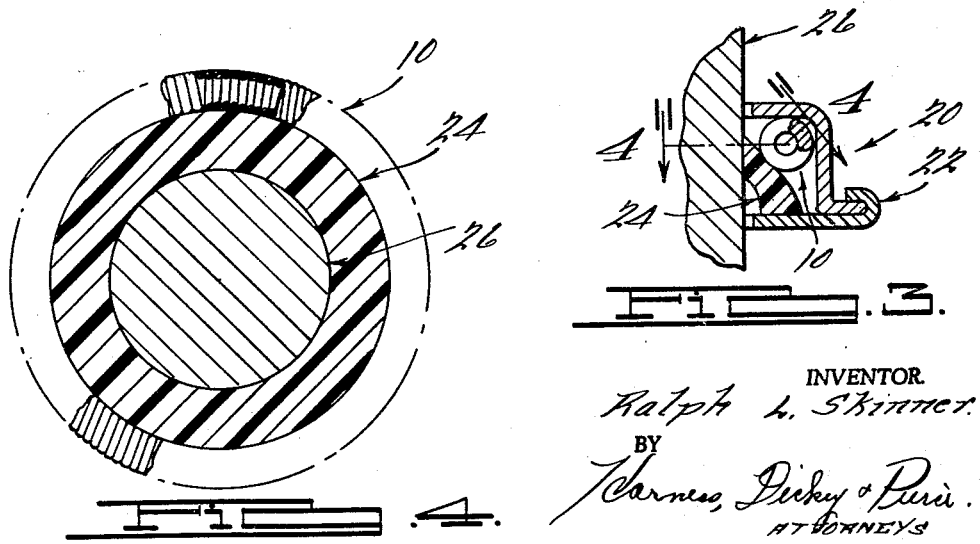
INVENTOR.
Ralph L. Skinner.
BY
Carnes, Dickey & Pierce.
ATTORNEYS 3,186,701
SPRING
Ralph L. Skinner, Sr., Birmingham, Mich.,
assignor to Renniks Co.
Filed Mar. 4, 1963, Ser. No. 262,729
1 Claim. (Cl. 267—1)

This invention relates generally to springs and more particularly to an improved garter spring.

This application is a continuation-in-part of my co-pending application Serial No. 56,222, filed September 15, 1960 for "Spring" now abandoned.

Annular springs, commonly termed "garter" springs, characteristically are made by joining the end portions of a helical coil spring. Generally, the helical coil spring is wound from wire of circular cross section in order to minimize manufacturing difficulties and costs. Such garter springs are often used to effect a radially inward bias on a circular component, for example, a shaft seal as shown in my copending application, Serial No. 834,070 filed August 17, 1959 for "Seal" now Patent No. 3,069,175 issued December 18, 1962, wherein a garter spring is disposed about an annular sealing element to bias the element against a shaft.

However, such known garter springs exhibit an undesirable characteristic in that the individual convolutions thereof engage the seal in spaced point contact resulting in a "biting" of the respective convolutions into the sealing element, eventually resulting in scoring of the element and in a change in the effective radial bias of the spring.

In accordance with one aspect of the present invention, the aforementioned problem is solved by grinding the outer periphery of the respective convolutions of the helical coil spring to a substantially cylindrical configuration, the central axis of which is the central axis of the spring. Because of its cylindrical configuration each convolution engages, for example, a sealing element, in what is essentially line contact, parallel to the central axis of the spring as opposed to the spaced point contact exhibited by conventional garter springs.

The aforementioned problem relating to "biting" of the spring into the sealing element is also present at the junction of the end portions of known garter springs.

In accordance with another feature of the present invention, this problem is also solved by a novel terminal end construction that facilitates joining of the opposite end portions of the spring to form a smooth and continuous annular garter spring substantially devoid of large spaces between the seal contacting convolutions thereof.

Accordingly, one object of the present invention is an improved garter spring.

Another object is a garter spring having generally cylindircal convolutions that engage a circumscribed object in line contact.

Another object is a spring that is easily joinable into a smooth substantially continuous annular configuration.

Other objects and advantages of the present invention will become apparent from a study of the following specification, claim and drawing wherein:

FIGURE 1 is a side view of a helical coil spring in accordance with the instant invention prior to coupling of the ends thereof;

FIG. 2 is a cross sectional view showing the end portions of the spring after assembly;

FIG. 3 is a cross sectional view of the spring in operative association with a seal; and FIG. 4 is a cross sectional view taken substantially along the line 4—4 of FIG. 3.

A garter spring 10, in accordance with an exemplary constructed embodiment of the present invention, comprises a plurality of helical convolutions 14 of relatively large diameter and a plurality of helical convolutions 16 of relatively smaller diameter at one end thereof. The spring 10 is wound from, for example, music wire of circular cross section and having a diameter of .016 inch. The helical convolutions 14 have an initial outside diameter of, for example, .082 inch.

In accordance with one feature of the present invention, the convolutions 14, respectively, of the spring 10 are ground to a generally cylindrical configuration defined by an outer peripheral surface 18 having an outside diameter of .078 inch. The essentially cylindrical outer peripheral surface 18 of each convolution the spring 10 results in what is essentially circumferentially extending line contact between the convolutions 14 and a member circumscribed thereby as opposed to point contact. It is to be recognized that the aforesaid line contact is theoretical in nature since a certain compression of the seal takes place resulting in contact over an elongated area. However the important consideration here is that garter springs heretofore known engaged a circumscribed member in a series of what in theory are circumferentially spaced point contacts. These point contacts in practice also enlarged into circular area contacts of smaller area and therefore of higher unit pressure than the contact areas of the spring of the instant invention. It is to be noted that the circular cross section of the convolutions 14 is maintained on the inner periphery thereof. It is also to be noted that the circular cross section of the convolutions 16 is maintained on the outer periphery thereof. The outside diameter of the convolution 16 is for example, .060 inch, which is greater than the inside diameter of .050 inch of the convolutions 14.

Accordingly, in accordance with another feature of the instant invention, the convolutions 16 are threadably engageable within and between the convolutions 14 at the opposite end of the spring 12. Since the convolutions 16 are substantially entirely engageable within the convolutions 14, the convolutions 14 at opposite ends of the spring 10 abut one another and present a substantially smooth and continuous external surface devoid of a large gap that could "bite" into a member circumscribed by the spring 10.

As best seen in FIG. 3, one application wherein the garter spring 10 has particular utility is in a seal 20 comprising an annular shell 22 containing an annular Teflon sealing element 24. The seal 20 is adapted to be placed about a shaft 56. The garter spring 10 maintains a radially inward bias on the sealing element 24 against the shaft 26. The line contact between the respective convolutions 14 of the spring 10 and the sealing element 24 precludes "biting," brinelling, or embedding of the spring 10 into the sealing element 24 which would interfere with both the radial bias of the spring 10 and with the free sliding motion of the sealing element 24 due to distortion or eccentric motion of the shaft 26 to be sealed.

From the foregoing description, it should be apparent that the garter spring 10 of the present invention is relatively easy to manufacture and assemble and functions to maintain a radially inward bias on a member while obviating the heretofore inherent disadvantages of garter springs wound in a helical configuration from wire of circular cross section, and wherein the end portions are joined with a gap between convolutions.

It is to be understood that the specific construction of the improved garter spring herein disclosed and described is presented for the purpose of explanation and illustration and is not intended to indicate limits of the invention, the scope of which is defined by the following claim.

What is claimed is:

A one piece garter spring for effecting a radially inward bias on a circumscribed member comprising, a plurality of helically wound convolutions of relatively large outside diameter and constant lead, each of said large diameter convolutions having generally cylindrical outer peripheral surfaces and arcuate inner peripheral surfaces, respectively, and a plurality of helically wound convolutions of relatively small outside diameter and relatively constant lead, each of said relatively small diameter convolutions having an arcuate outer peripheral surface the outside diameter of which is relatively smaller than the outside diameter of said relatively large convolutions but relatively larger than the inside diameter of said relatively large diameter convolutions, said small diameter convolutions being formed integrally with said large diameter convolutions thereof at one end of said relatively large convolutions, the arcuate outer peripheral surfaces of said relatively smaller convolutions being engaged between the arcuate inner peripheral surfaces of said relatively larger convolutions, respectively, at the other end thereof in threaded relationship, said relatively smaller convolutions being substantially entirely enclosed within said relatively larger convolutions so that the relatively large convolutions at the opposite ends of said spring are substantially juxtaposed against one another thereby to exhibit a substantially continuous relatively smooth outer peripheral surface that is engageable with an outer peripheral surface on the circumscribed member in substantially continuous circumferentially extending line contact.

References Cited by the Examiner

UNITED STATES PATENTS

| | | |
|---|---|---|
| 158,361 | 1/75 | Clooney. |
| 2,101,346 | 12/37 | Robertson _____ 267—1 X |
| 2,622,448 | 12/52 | Lorig _____ 267—1 X |
| 2,721,091 | 10/55 | Pfefferle et al. _____ 267—1 X |
| 2,801,700 | 8/57 | Hall _____ 267—1 X |
| 2,948,529 | 8/60 | Maier _____ 267—61 X |
| 2,991,064 | 7/61 | De Jean _____ 267—1 |

ARTHUR L. LA POINT, *Primary Examiner.*